Dec. 24, 1929.   G. E. NELSON   1,740,521
ARTIFICIAL BAIT
Filed April 21, 1928
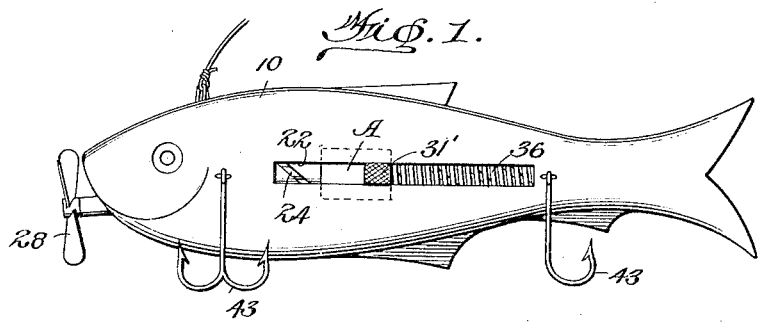
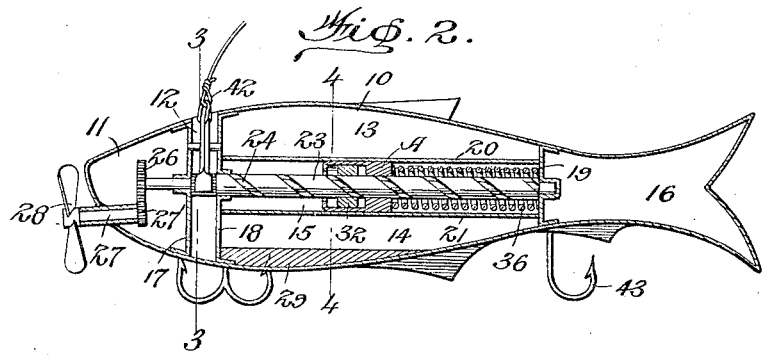
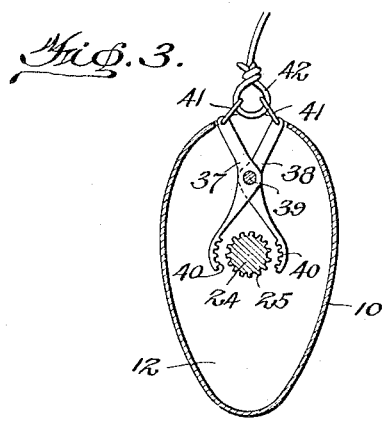
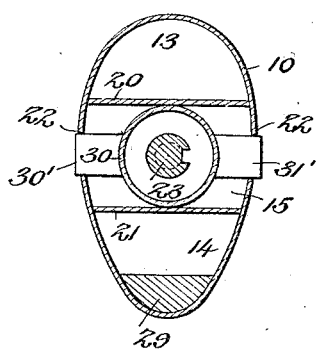
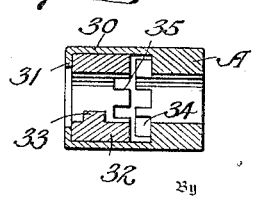
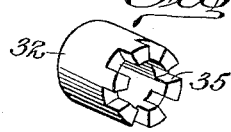
Inventor
G. E. Nelson,
Bright & Bailey
Attorneys Patented Dec. 24, 1929

1,740,521

UNITED STATES PATENT OFFICE

GUSTAVUS EDWARD NELSON, OF SPRINGFIELD, ILLINOIS

ARTIFICIAL BAIT   REISSUED

Application filed April 21, 1928. Serial No. 271,838.

My invention relates to artificial fish-bait; and it embodies a bait of this type which is self-propelled so as to impart thereto the aspect of natural life and thus increase the effectiveness of the bait as a lure.

My invention contemplates the provision of a bait of the type specified wherein the propelling mechanism may be easily and quickly energized and with the propelling element of said mechanism so arranged with respect to the body of the bait that said body will be held below the surface of the water during travel of the bait under the influence of said mechanism.

Furthermore, my invention contemplates the provision of means whereby the propelling mechanism will be locked against operation while the bait is supported in suspension by a fishing line, but which will permit free operation of said mechanism when the bait is disposed in water and supported by the latter.

I will describe my invention in the best form known to me at present, but it will be apparent that the same is susceptible to changes in form, proportions and arrangement by the exercise of ordinary mechanical skill and without departing from the spirit thereof.

In the drawings chosen to illustrate my invention the scope whereof is set forth in the appended claims—

Figure 1 is a side elevation of my improved bait;

Figure 2, a longitudinal section of the bait;

Figure 3, a section on the line 3—3 of Figure 2;

Figure 4, a section on the line 4—4 of Figure 2; and

Figures 5, 6 and 7 are detail views of elements of the propelling mechanism.

In the embodiment of my invention illustrated in the drawing my improved bait is shown as comprising a buoyant hollow body 10 formed of suitable material and shaped to simulate a fish. I divide the interior of the body 10 into compartments 11, 12, 13, 14, 15, and 16 through the medium of transverse partitions 17, 18, 19 and longitudinal partitions 20 and 21. The compartment 12 opens to the exterior of the body through the upper side of the latter, while the compartment 15 opens to the exterior of the body through corresponding oppositely disposed longitudinal slots 22 provided in the sides of the body. Journalled in the partitions 17, 18 and 19 is a drive shaft 23 provided with a spiral groove 24 for a purpose that will presently appear. That portion of the shaft located between the partitions 17 and 18 is provided with longitudinal ribs 25, while the end of the shaft located in compartment 11 has fixed thereon a gear 26. Rotatably mounted in the forward end of the body beneath the shaft 23 is a shaft 27, the axis of rotation of which is downwardly inclined with respect to the longitudinal axis of the body. Located exteriorly of the body and fixed on the outer end of the shaft 27 is a propeller 28 while the inner end of said shaft carries a gear 27' in mesh with gear 26. It will be noted that the body 10 is weighted as at 29 so that when same is immersed in water it will always assume a desired predetermined position.

The propelling mechanism of my improved bait includes a member A slidably mounted on the drive shaft 23, said member having oppositely arranged lateral extensions 30' and 31' which extend respectively through the slots 22 whereby they may be gripped exteriorly of the body for imparting sliding movement to said member. One end of the member A is provided with a tubular extension 30 having an inwardly directed flange 31 at its outer end. Disposed within the extension 30 for rotation and limited longitudinal reciprocation is a ring 32 having a projection 33 extending into the spiral groove 24 of the shaft 23. The adjacent ends of the member A and the ring 32 are provided with teeth 34 and 35 which are adapted to enter into and out of interengagement in a manner and for a purpose to be presently set forth. A spring 36 encircles the shaft 23 between the member A and the partition 19 and reacts from the latter to urge said member toward the partition 18 until the projections 30' and 31' are arrested by the forward ends of the slots 22 as will be obvious.

From the foregoing construction it will be apparent that by holding the projections 30' and 31' and moving the member A and ring 32 to the right in Figures 1 and 2, the spring 36 will be energized. It will be further apparent that during the first portion of such movement of the member A and ring 32, the projection 33 engaging the wall of the spiral groove 24 will resist movement of the ring with the member and cause the former to move away from the latter to the position shown in Figure 6 when the teeth 34 and 35 will be positioned out of interengagement so that during further spring energizing movement of the member A the ring 32 will rotate freely within the extension 30 in response to cooperation between the projection 33 and groove 24. Upon release of the member A after energization of spring 36 the foregoing operation will be reversed. In other words, the resistance offered to endwise movement of the ring 32 by the cooperation between the projection 33 and groove 24 will cause the ring and member A to approach each other and interengage the teeth 34 and 35 thus locking the ring against rotation and rendering further movement of the ring and member under the influence of spring 36 effective to rotate the shaft 23, which rotation is transmitted to the propeller 28 through gears 26, 27' and shaft 27.

In order to provide against the operation of the propelling mechanism when energized until the bait is immersed in water, I provide a clamp operable by the weight of the bait, when the latter is supported in suspension by a fishing line, to hold the shaft 23 against rotation, but which is rendered ineffective to so hold said shaft when the weight of the bait is removed from the suspending line by immersion of the bait in water. In the specific instance shown such clamp is formed of two similarly shaped opposed members 37 and 38 disposed in the compartment 12 and pivotally mounted on a pin 39 supported by the partitions 17 and 18. These members are so shaped that their lower ends embrace the shaft 23 and are provided with teeth 40 adapted to move into and out of inter-engagement with the ribs 25 on shaft 23. Swiveled in the upper end of each arm 37 and 38 is a link 41 and through these links a fishing line is adapted to be looped as at 42. By the construction and arrangement of the arms 37 and 38 it will be apparent that when the weight of the bait is imposed upon the line said arms will be pivoted so as to interengage the teeth 40 with the ribs 25 and thus hold the shaft 23 against rotation, it being understood that the strength of the spring 36 is such as to permit this result to be attained. However, as soon as the bait is immersed in water its buoyancy will remove its weight from the line, the members 37 and 38 will assume their normal position as shown in Figure 3, when the shaft 23 is free to rotate under the influence of the expanding force of spring 36.

Suitable hooks 43 are mounted on the body 10 as shown, their location being a matter of choice.

I claim:

1. An artificial bait comprising a body, a propeller supported by the body in advance thereof and having its axis of rotation downwardly inclined with respect to the longitudinal axis of the body, and means carried by the body to rotate said propeller.

2. An artificial bait comprising a body, a propeller shaft rotatably supported by and extending in advance of the body and having its axis of rotation downwardly inclined with respect to the longitudinal axis of the body, a drive shaft rotatably mounted within the body, connections between the drive and propeller shafts, and means within the body for rotating the drive shaft.

3. An artificial bait comprising a hollow body, a member slidably and non-rotatably mounted in said body, a shaft rotatably mounted in the body, means between the shaft and member operable by sliding movement of said member in one direction to rotate the shaft and ineffective to rotate said shaft during sliding movement of the member in the opposite direction, a propeller exteriorly of the body, and connections between said propeller and shaft.

4. An artificial bait comprising a hollow body, a member slidably and non-rotatably mounted in said body, a shaft rotatably mounted in the body, means between the shaft and member operable by sliding movement of said member in one direction to rotate the shaft and ineffective to rotate said shaft during sliding movement of the member in the opposite direction, a propeller exteriorly of the body, connections between said propeller and shaft, and spring means for moving the member in a direction effective to rotate the shaft.

5. An artificial bait comprising a hollow body, a hollow member slidably and non-rotatably mounted in said body, a shaft rotatably mounted within the body and extending through said member, said shaft having a spiral groove therein, a disk rotatably mounted within the member and surrounding the shaft, a projection on said disk extending into the spiral groove, means whereby said disk and member are interlocked when the latter is moved in one direction and disengaged when said member is moved in the opposite direction, a spring energized by the last named movement of the member and reacting to impart the first named movement to said member, a propeller exteriorly of the body and connections between the propeller and shaft.

6. An artificial bait comprising a body, a rotatable shaft within the body, means for rotating said shaft, means carried by said body and to which a line is adapted to be directly attached, said means being operable by the weight of the body when the latter is supported in suspension by a line to lock said shaft against rotation under the influence of said shaft rotating means and ineffective to so lock said shaft when the body is supported by buoyancy, a propeller exteriorly of the body, and connections between the shaft and propeller.

7. An artificial bait comprising a body, a propeller carried by the body, means carried by the body for rotating the propeller, and means carried by said body and to which a line is adapted to be directly attached, said means being operable by the weight of the body when the latter is supported in suspension by a line to lock the propeller rotating means against operation and ineffective to so lock said means when the body is supported by buoyancy.

8. An artificial bait comprising a body, a rotatable shaft within the body, means for rotating said shaft, pivoted members carried by the body and through which the latter is adapted to be attached to a line, said members being operable by the weight of the body, when the latter is supported in suspension by a line, into clamping relation to the shaft and thereby lock the latter against rotation under the influence of said shaft rotating means, and ineffective to so lock said shaft when the body is supported by buoyancy, a propeller exteriorly of the body, and connections between the shaft and propeller.

In testimony whereof I hereunto affix my signature.

GUSTAVUS EDWARD NELSON.